US012058057B2

(12) United States Patent
Kiessling

(10) Patent No.: US 12,058,057 B2
(45) Date of Patent: Aug. 6, 2024

(54) SCHEDULING OF DATA TRAFFIC

(71) Applicant: SIEMENS AKTIENGESELLSCHAFT, Munich (DE)

(72) Inventor: Marcel Kiessling, Bayern (DE)

(73) Assignee: Siemens Aktiengesellschaft, Munich (DE)

( * ) Notice: Subject to any disclaimer, the term of this patent is extended or adjusted under 35 U.S.C. 154(b) by 186 days.

(21) Appl. No.: 16/648,386

(22) PCT Filed: Sep. 13, 2018

(86) PCT No.: PCT/EP2018/074682
§ 371 (c)(1),
(2) Date: Mar. 18, 2020

(87) PCT Pub. No.: WO2019/053094
PCT Pub. Date: Mar. 21, 2019

(65) Prior Publication Data
US 2020/0228463 A1   Jul. 16, 2020

(30) Foreign Application Priority Data
Sep. 18, 2017   (EP) .................................. 17191643

(51) Int. Cl.
*H04L 49/20* (2022.01)
*H04L 47/2416* (2022.01)
*H04L 49/354* (2022.01)

(52) U.S. Cl.
CPC ........ *H04L 49/206* (2013.01); *H04L 47/2416* (2013.01); *H04L 49/354* (2013.01)

(58) Field of Classification Search
CPC .. H04L 49/206; H04L 47/2416; H04L 49/354
(Continued)

(56) References Cited

U.S. PATENT DOCUMENTS

2002/0122395 A1* 9/2002 Bourlas ................ H04W 28/02
                                                                  370/329
2003/0174701 A1* 9/2003 Angle ................... H04L 49/254
                                                                  370/390
(Continued)

FOREIGN PATENT DOCUMENTS

EP   1942618 A2   7/2008
EP   2020786 A2   2/2009
(Continued)

OTHER PUBLICATIONS

International Search Report and the Written Opinion for International Patent Application PCT/EP2018/074682 mailed Nov. 27, 2018.
(Continued)

*Primary Examiner* — Suraj M Joshi
*Assistant Examiner* — Sherman Lin
(74) *Attorney, Agent, or Firm* — Lempia Summerfield Katz LLC

(57) ABSTRACT

A method of scheduling traffic in a network node is provided. A cyclic traffic schedule for a first traffic class, such as a first real time traffic class, includes a reception phase and a transmission phase. The method includes setting the transmission phase (T00) of the network node to coincide with the reception phase of at least two neighboring network nodes.

17 Claims, 10 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 2012/0148237 A1* | 6/2012 | Harrison | ................ | G06N 10/00 |
| | | | | 398/180 |
| 2013/0128895 A1 | 5/2013 | Kirrmann | | |
| 2013/0322255 A1* | 12/2013 | Dillon | ................ | H04L 43/0888 |
| | | | | 370/236 |
| 2017/0280357 A1* | 9/2017 | Finn | ................... | H04L 49/9005 |

FOREIGN PATENT DOCUMENTS

| | | | | |
|---|---|---|---|---|
| EP | 2201725 A2 * | 6/2010 | ............ | H04L 45/00 |
| EP | 2201725 B1 | 6/2012 | | |

OTHER PUBLICATIONS

European Search Report for European Application No. 17191643.0-1215 dated Mar. 2, 2018.

* cited by examiner

FIG 3b
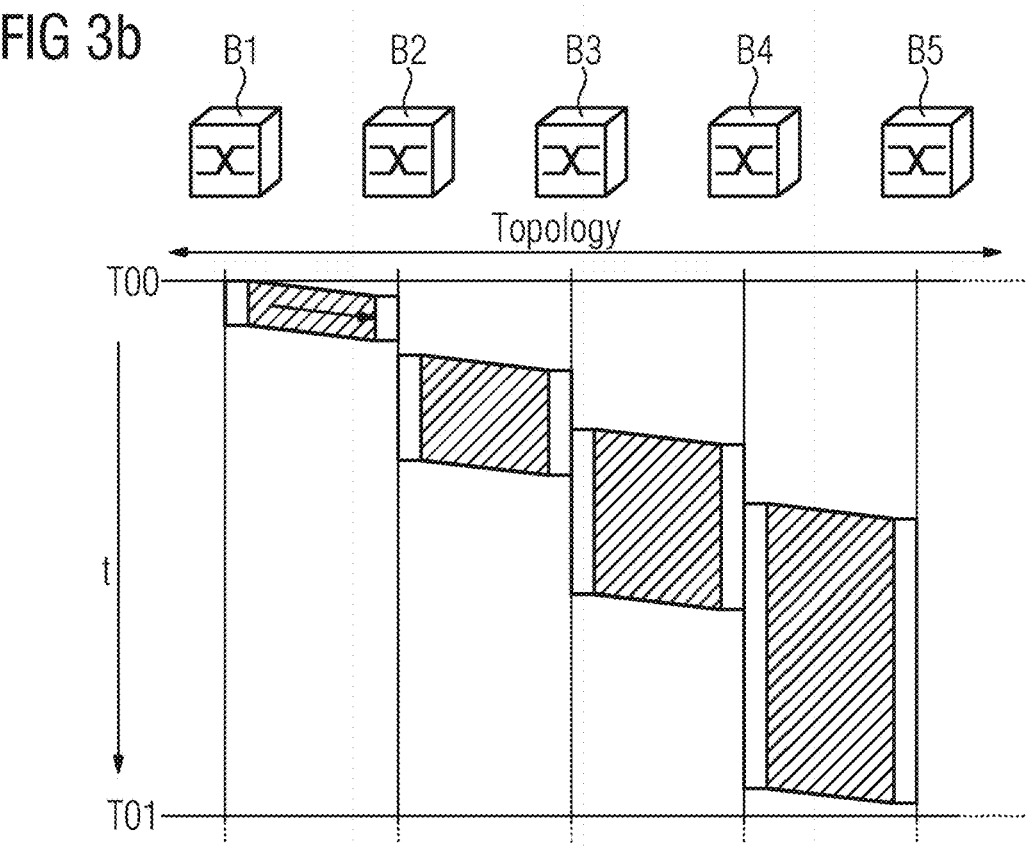
FIG 3c
| T00: ooo |
| T01: coo |
| T00$_{B2}$: ooo |
| T01$_{B2}$: coo |
| T00$_{B3}$: ooo |
| T01$_{B3}$: coo |
| T00$_{B4}$: ooo |
| T01$_{B4}$: coo |
FIG 3d
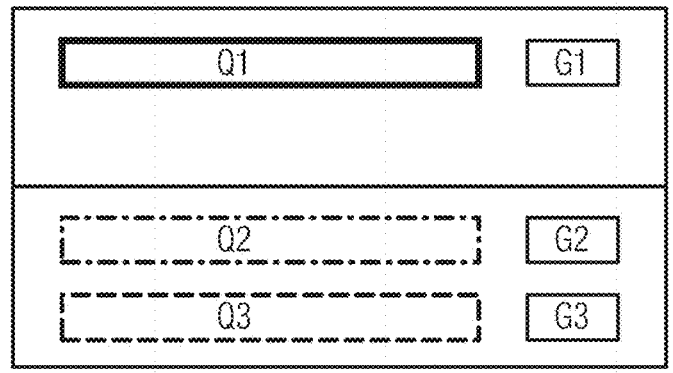

FIG 11b
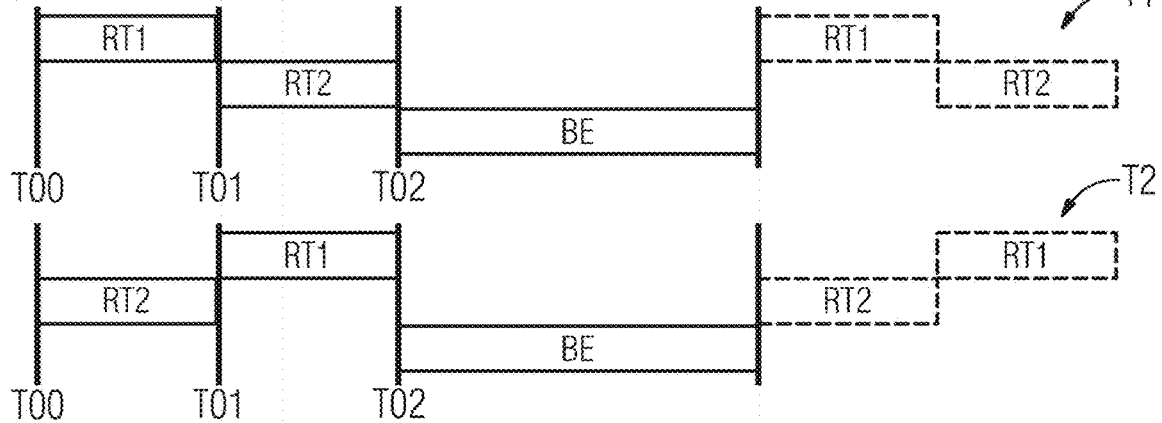
FIG 11c
T1
T00: OCC
T01: COC
T02: CCO
T2
T00: COC
T01: OCC
T02: CCO
FIG 12
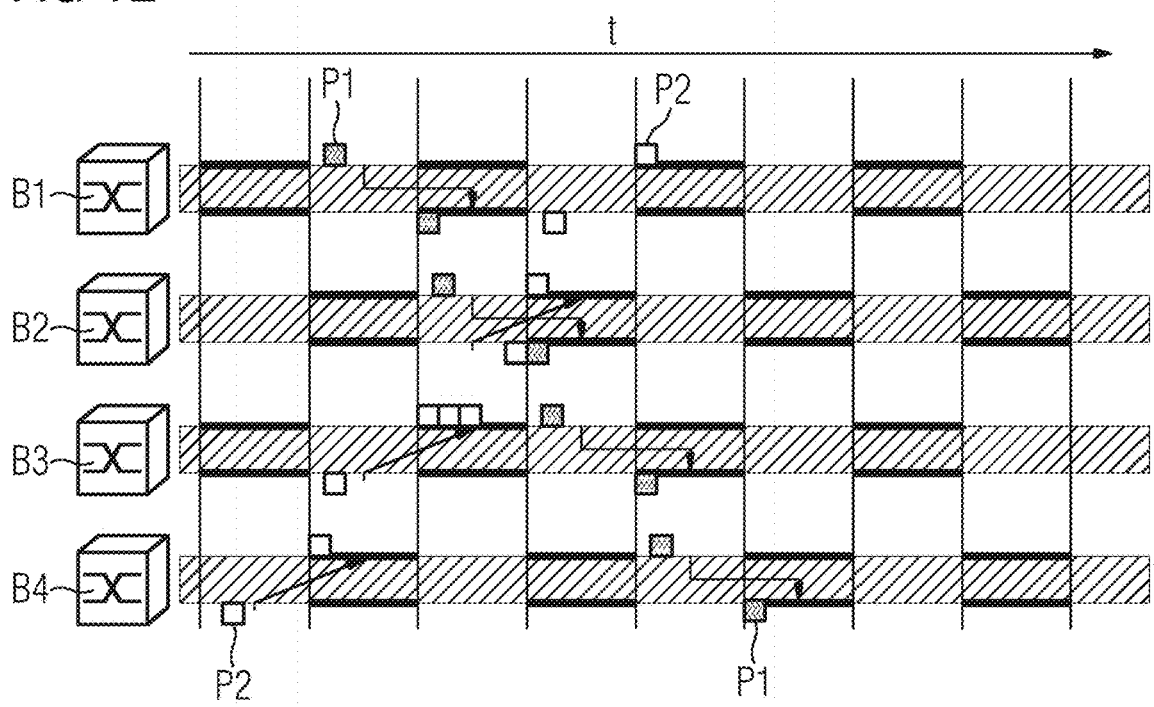

SCHEDULING OF DATA TRAFFIC

This application is the National Stage of International Application No. PCT/EP2018/074682, filed Sep. 13, 2018, which claims the benefit of European Patent Application No. EP17191643.0, filed Sep. 18, 2017. The entire contents of these documents are hereby incorporated herein by reference.

BACKGROUND

The present embodiments relate to scheduling traffic in a network node.

Local area networks (LANs) are routinely deployed for providing network connectivity among nodes confined to a limited area. A LAN typically enables connected nodes to transmit data packets (e.g., frames). Usually, such a frame will include an address identifying the receiving node or destination. The data transmission is mostly based on the Ethernet or IEEE 802.3 protocol. To extend the range of such networks layer, 2 switches (e.g., bridges) are commonly used. In addition to layer 1 functions (e.g., signal amplification, forwarding) a bridge may extract address information so as to filter traffic.

The Institute of Electrical and Electronics Engineers (IEEE) came up with a standard (IEEE 802.1Q) defining the operation of layer 2 VLAN bridges that permit the definition, operation, and administration of virtual LAN topologies within a bridged LAN infrastructure. Within the IEEE 802.1Q concept, spanning tree algorithms may be employed to provide for loop-free transmission of data. As LANs should be enabled to service different classes of traffic, there is a need to enhance bridges with a way to differentiate between different service classes of traffic. A suitable way to define traffic classes or service classes is to provide for identifiers or labels in frame headers that govern the treatment by individual bridges.

Additionally, in case of variation in latency of data packet transmission, data packet loss and/or violation of a time constraint (e.g., as a real-time constraint) may occur. For example, variation in latency may appear, for example, due to accumulation of jitter and/or lack of resources, such as bandwidth, at one or more nodes.

SUMMARY AND DESCRIPTION

The scope of the present invention is defined solely by the appended claims and is not affected to any degree by the statements within this summary.

The present embodiments may obviate one or more of the drawbacks or limitations in the related art. For example, transmission of one or more data packets with, for example, bounded latency, is provided through a network. As another example, a predictable latency for data packet transmission is provided. As yet another example, legacy devices, such as network bridges, for example, without a time-aware-shaper (TAS), is enabled to fulfill a time constraint imposed.

According to a first aspect, a method of scheduling traffic in a network node is provided. The method includes a cyclic traffic schedule for a first traffic class (e.g., a first real time traffic class). The cyclic traffic schedule includes a reception phase and a transmission phase. The method further includes and/or initiates the act of setting the transmission phase of the network node to coincide with the reception phase of at least two neighboring network nodes.

According to a second aspect, a network node (e.g., a network bridge) is provided. The network node is configured to perform any one of the method acts of the first aspect.

According to a third aspect, a network includes a plurality of network nodes configured to perform any one of the acts of the first aspect.

BRIEF DESCRIPTION OF THE DRAWINGS

FIG. 3b shows an alternative schematic representation of an exemplary data packet transmission with increasing latency in an exemplary network.

FIG. 3c shows a schematic representation of an exemplary scheduling list for gate operation of a plurality of bridges.

FIG. 3d shows a schematic representation of multiple exemplary queues including data packets to be transmitted on the network.

FIG. 11b shows a schematic representation of an exemplary cyclic traffic schedule for the traffic classes.

FIG. 11c shows a schematic representation of exemplary states of respective gates during the cyclic traffic schedule.

FIG. 12 shows a schematic representation of exemplary data packet transmission in an exemplary network.

DETAILED DESCRIPTION

Figure 1:
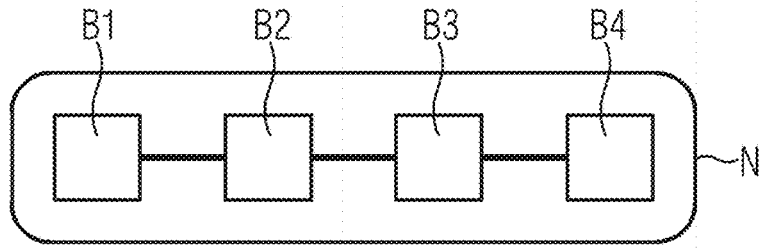
FIG. 1 shows a schematic representation of one embodiment of a network with a first network topology.

FIG. 1 shows one embodiment of a network N with a line topology; in other words, network nodes B1, B2, B3, B4 are connected in a line (e.g., having open ends). The network nodes B1, B2, B3, B4 are connected via transmission lines, via which data packet transmission and/or reception is possible. The network nodes B1, . . . , B4 may transmit and/or receive data packets (e.g., in a synchronized manner) via the transmission lines. Other network nodes, such as bridges, may exist in the network N but may not be part of a path via which one or more data packets are transmitted. For example, according to IEEE 802.1Q, the network N may be a VLAN (i.e., a portion of a larger network).

Figure 2:
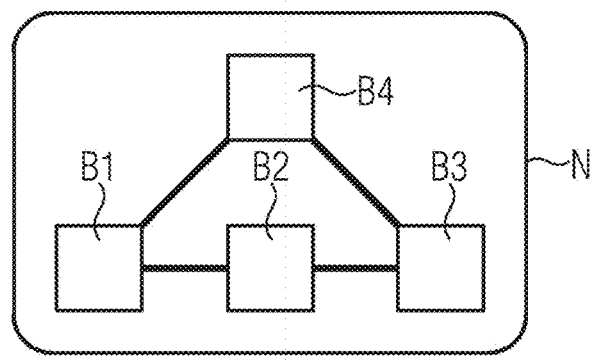
FIG. 2 shows a schematic representation of one embodiment of a network with a second network topology.

FIG. 2 shows one embodiment of a network N with a ring topology (i.e., the network nodes B1, B2, B3, B4 are connected in a circle). The network nodes B1, B2, B3, B4 are connected via transmission lines, via which data packet transmission and/or reception is possible. The network nodes B1, . . . , B4 may transmit and/or receive data packets (e.g., in a synchronized manner) via the connection lines. As in the above, the network N may also be VLAN. The number of network nodes or bridges shown is just exemplary. In other words, more than the four bridges B1, B2, B3, B4 shown may be present in a network N.

Thus, in general, a network N that includes a number of predetermined network nodes, between which data packet transmission and reception occurs (e.g., in a synchronized manner; within predefined time intervals with fixed starting points and ending points in time with respect to a reference clock) may be provided. A network may be a segment of a larger network or may include one or more network segments, such as one or more VLANs.

Transmission lines between network nodes may be wired but may include wireless transmission lines (e.g., data packets may be transmitted and/or received via radio communication). In one embodiment, transmission and/or reception in a network N takes place via Ethernet and/or according to one or more of the collection of IEEE 802.3 standards, as mentioned above.

In one embodiment, a network node may support a Full-Duplex transmission (e.g., Full-Duplex between the physical and the MAC layer). The transmission line (e.g., one or more cables between two adjacent network nodes) may, however, support a Dual-Simplex transmission or a (true) Full-Duplex transmission (e.g., with bi-directional transmission per wire pair) as well. Hence, a plurality of network nodes, such as one or more bridges, may support Full-Duplex, and the transmission line between each two bridges may be a true Full-Duplex or a Dual-Simplex or any other class of transmission line supporting simultaneous bi-directional transmission between two (e.g., adjacent) network nodes. For example, IEEE standard 802.3 (e.g., 802.3x) may be used to set up a network with network nodes supporting Full-Duplex.

Figure 3A:
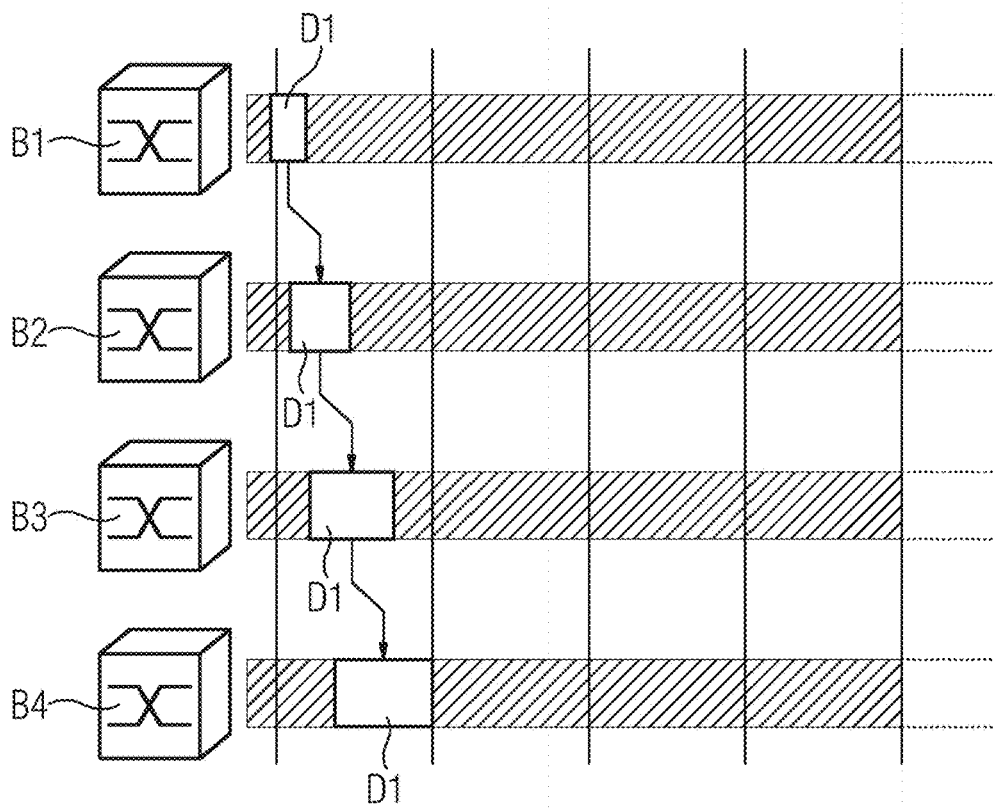
FIG. 3a shows a schematic representation of an exemplary data packet transmission with increasing latency in an exemplary network.

Turning to FIG. 3a, a data packet transmission with ever increasing latency in an exemplary network is described. Data packet transmission occurs via bridges B1, B2, B3 and B4, which form a line segment of a network. Thus, one or more data packets being injected by bridge B1 are first transmitted to bridge B2, and subsequently transmitted from bridge B2 to bridge B3, and finally transmitted from bridge B3 to bridge B4. Bridges B1, B2, B3, B4 may be connected to terminal devices as, for example, a data packet source, where data packet transmission starts, and/or a data packet destination, where data packet transmission ends.

As shown by the rectangle D1 in FIG. 3a, latency may vary and may accumulate during transmission of one or more data packets. Thus, the time of arrival of one or more data packets at a bridge may not be predicted anymore with sufficient reliability. The rectangle depicted, D1, becomes larger from hop to hop. Thus, the transmission of one or more data packets may not be performed during a processing phase (e.g., for processing data transmission of one or more data packets of a first traffic class). Thus, an undefined latency may occur in the network, and/or data packet loss may occur.

In FIG. 3a, the bridges are shown on top of each other, and one or more data packets being transmitted from bridge B1 to bridge B4 are hopping over bridge B2 and bridge B3. Transmission and reception of one or more data packets of a first traffic class is depicted in the first column of FIG. 3a. One or more data packets are transmitted on the medium (e.g., the transmission line connecting bridge B1 with bridge B2). As the one or more data packets have a certain data volume, the injection of data packets takes a certain amount of time. In one embodiment, the injection of one or more data packets takes place at the beginning of a processing phase. As depicted in FIG. 3a, there may be multiple processing phases for different traffic classes. During a certain processing phase, only transmission and/or reception of a certain traffic class may be allowed. The processing phases may be synchronized (e.g., the processing phases coincide) between the network bridges B1, B2, B3, B4.

Figure 7:
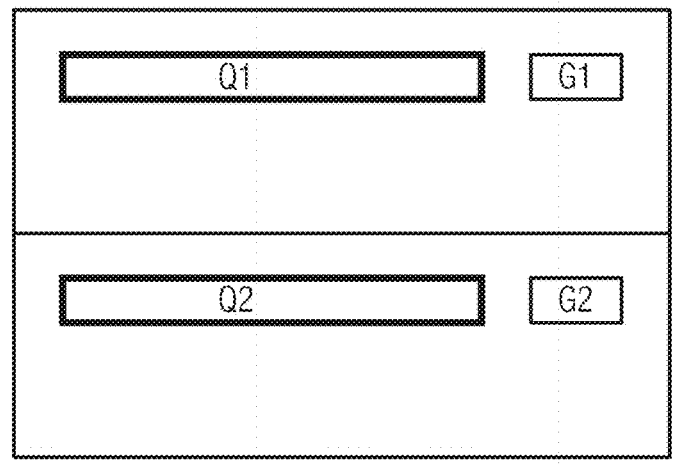
FIG. 7 shows a schematic representation of multiple exemplary queues including data packets of a first traffic class and a second traffic class to be transmitted on the network.

Due to the distance and the corresponding travel time for signals to travel the distance between bridges B1 and B2, the one or more data packets D1 may arrive at bridge B2 at a later point in time (e.g., but still during the processing phase of the first traffic type). Additionally, reception of the one or more data packets at a bridge may be further delayed due to the physical properties of the transmission line (e.g., due to the propagation speed of a cable) and/or due to certain properties of a bridge, such as the speed of signals and signal processing in or between the physical layers of a bridge, the medium access layer of a bridge, and/or the internal forwarding of the one or more data packets. Further reasons for a delay that increases latency in the transmission and/or reception of one or more data packets may be due to the fact that a port for data transmission/reception may be closed or that one or more other data packets have the same or a higher priority as the data packets considered. The basic architecture of an exemplary network bridge as just described is also shown in FIG. 7-2 of IEEE 802.1D. Latency may be increased due to inaccuracy in the synchronization of the bridges B1, B2, B3, B4 (e.g., referred to as jitter).

As shown in FIG. 3a, delay and thus the latency may increase each hop. As the functioning of a network bridge relies on the reservation of resources, such as a certain amount of memory at a certain time, the latency and uncertainty with respect to the arrival of the one or more data packets D1 may cause a failure in the transmission of the one or more data packets. Also, delay of the transmission of the one or more data packets may not be predictable, as due to the closure of processing, phase data packet transmission (e.g., for a first traffic class) is to be interrupted and may only be continued in the subsequent processing phase for transmission and/or reception of the traffic class.

In FIG. 3b, the effect of increasing latency and uncertainty of the time of arrival is depicted by another exemplary representation. Bridges B1, B2, B3 and B4 are depicted side by side. Transmission of one or more data packets of a first traffic class may occur during processing phase T00. This processing phase T00 is followed by a processing phase for processing one or more data packets of a second traffic type. Now, at the beginning of the phase T00, one or more data packets are injected and received at bridge B2. For the reasons mentioned in the above, delay of transmission may occur, and latency of the transmission of the one or more data packets may not be predictable anymore. The time span of phase T00 and/or the resources residing in a network node may be increased in order to allow for enough buffer for the one or more data packets to be transmitted. However, this is less advantageous, as it would increase costs of the individual network nodes.

Transmission and/or reception of a bridge may be controlled by a respective gate allowing one or more data packets to be transmitted from a data packet queue (e.g., as shown in FIG. 3d). Each data packet queue may be controlled by a respective gate. Each data packet queue may be dedicated to a particular traffic class exclusively (e.g., only data packets of a certain traffic class may be stored in a certain queue). In FIG. 3c, the gate configurations of bridges B1, B2, B3 and B4 for the exemplary embodiments of FIGS. 3 and 3b are shown. During a processing phase, one or more data packets may be transmitted by bridge B1. During the same processing phase, the data packets may also be received by bridge B2 and transmitted (e.g., forwarded) by bridge B2 to bridge B3, etc. The respective configurations of the one or more gates of bridges B2, B3 and B4 are denoted as T00, T01, T00B2, T01B2, T00B3, T01B3, T00B4, and T01B4, respectively. A gate may be opened or closed. These two gate states are represented by "o" and "c", respectively, in FIG. 3c. In the example of FIGS. 3c and 3d, three queues Q1, Q2, Q3 and corresponding gates G1, G2, G3 are presented. Thus, data packet transmission from the three queues may be managed by gates G1, G2, G3. The gates G1, G2, G3 may be controlled by a control list including gate states or respective instructions to open or close one or more gates (e.g., one or more lists containing the gate states, as depicted in FIG. 3c). For example, one or more data packets of a first traffic class may be stored in queue Q1, whereas queues Q2 and Q3 may contain one or more data packets of a second and a third traffic class, respectively.

During a transmission phase for the first traffic class, gate G1 may thus be opened. In addition, gates G2 and G3 for the second traffic class and/or the third traffic class may be opened during that transmission phase as well. This is represented by "T00:ooo" showing all gates open. Naturally, contention between data packet transmission from the queues Q1, Q2, Q3 may occur (e.g., as all gates are open). In such a case, a priority assigned to the first traffic class, the second class, and/or the third traffic class may be employed to manage transmission of one or more data packets from queues Q1, Q2, Q3. For example, the first traffic class may have the highest priority, so that data packets from that queue are given prevalence over one or more data packets from queues Q2 and/or Q3. The same may be applied in order to govern transmission in case of contention between data packets from queues Q2 and Q3.

Figure 4:
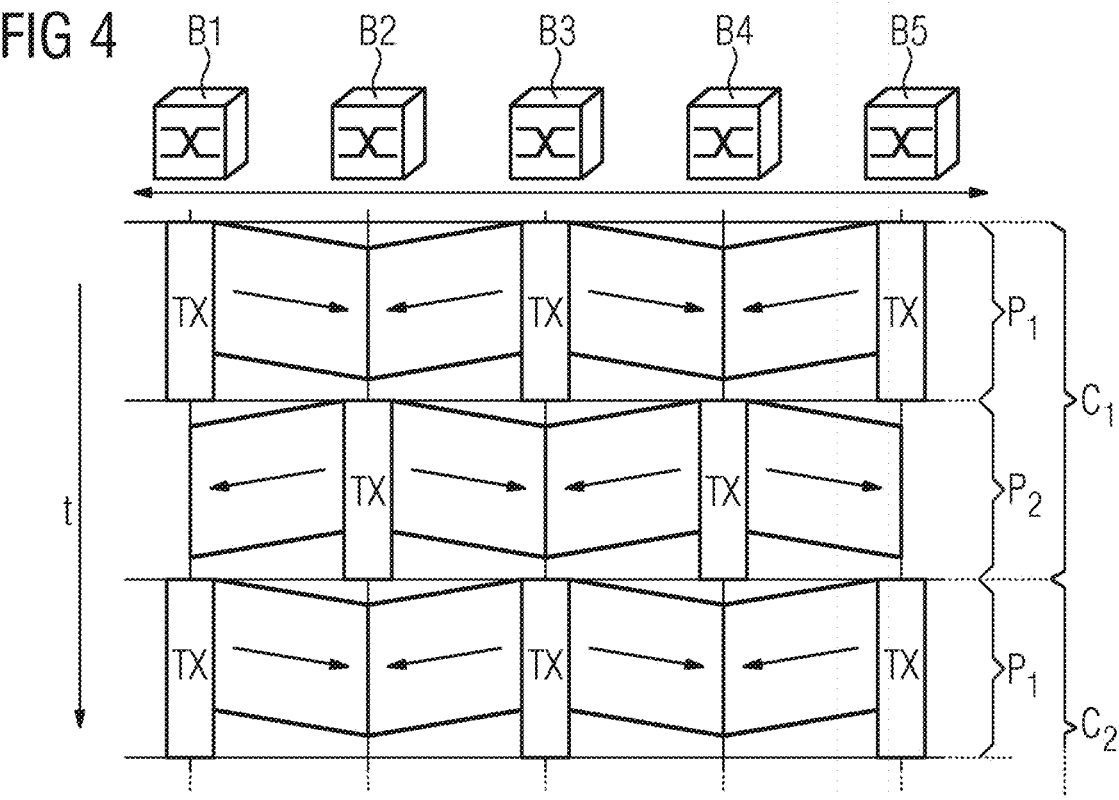
FIG. 4 shows a schematic representation of exemplary traffic scheduling for one or more data packets in an exemplary network.

FIG. 4 shows a traffic schedule for transmission of one or more data packets in an exemplary network. The network N may again include bridges B1, B2, B3, B4 and an additional bridge B5. However, still more bridges (not shown) may be present (e.g., as described in the above). Thus, for data packet transmission, a data packet has to travel through the network N by hopping from bridge to bridge.

During a first phase P1 of a first cycle c1 of the cyclic traffic schedule, bridge B1 is configured to transmit one or more data packets over the medium to bridge B2. Bridge B2 is configured to receive one or more data packets from bridge B1 and from bridge B3 during phase P1; the transmission of one or more data packets from bridge B2 may be blocked by closing a respective gate during that time. Thus, bridge B3 is configured to transmit one or more data packets to bridge B2 and bridge B4 during the first phase P1, whereas bridge B4 is configured to receive one or more data packets from bridges B3 and B5 during the first phase P1 of the periodic traffic schedule.

For bridge B1, the first phase P1 of cyclic traffic schedule c1 is a transmission phase, whereas the first phase is a reception phase for bridge B2 and a transmission phase again for bridge B3, but a reception phase for bridge B4, and a transmission phase for bridge B5. In other words, during a reception phase, a network node, such as a network bridge (e.g., bridge B2), is configured to receive one or more data packets from two neighboring nodes, such as two neighboring network nodes (e.g., bridges B1 and B3). During a transmission phase, a network node, such as a network bridge (e.g., bridge B2) is configured to transmit one or more data packets to two neighboring nodes, such as two neighboring network nodes (e.g., bridges B1 and B3). Thus, two neighboring bridges along the transmission path of the one or more data packets may be configured in an opposite manner regarding transmission and reception phases, whereas next-but-one bridges are configured in a coinciding manner regarding the transmission phase and the reception phase.

In FIG. 4, the first phase P1 of the cyclic data traffic schedule is followed directly by a second phase P2 of the cyclic traffic schedule. During the second phase P2, bridge B1 is configured to receive one or more data packet from neighboring bridges (e.g., the bridge B2). During phase P2, bridge B2 is configured to transmit one or more data packets to neighboring bridges (e.g., bridges B1 and B3), whereas bridge B3 is configured to receive one or more data packets from neighboring bridges B2 and B4. Bridge B4 is configured to transmit one or more data packets to neighboring bridges B3 and B5 during the second phase P2 of the cyclic traffic schedule. During phase p2 of cycle C1, the transmission and reception phases of the respective bridges are inversed.

Phase P2 of cycle c1 of the cyclic traffic schedule is followed by phase P1 of cycle c2 of the cyclic traffic schedule. Hence, the cyclic traffic schedule may include a number of repetitions of identical cycles c1, c2.

The traffic schedule shown in FIG. 4 is intended for a certain traffic class (e.g., a first traffic class), such as a traffic class with a real-time constraint. One or more other traffic classes may have another traffic schedule to adhere to. Thus, one or more traffic schedules may exist simultaneously. Each traffic schedule may govern transmission and reception of one or more data packets of a respective traffic class. Thus, one or more traffic schedules that have the same or a different arrangement and timing of the respective transmission and/or reception phase may be provided. Other phases such as transmission and/or reception phases for other traffic classes, a back-off-phase, or a buffer-phase may be provided.

According to an embodiment, one or more data packets (e.g., of a first traffic class) received during a first phase P1 (e.g., of cycle c1) are delayed and transmitted during a second phase P2 (e.g., of cycle C1). Accordingly, one or more data packets transmitted during a phase P1 are received, delayed, and only forwarded by a neighboring bridge during the subsequent phase P2 (e.g., of cycle C1).

One or more data packets (e.g., of a first traffic class) received during a phase P2 (e.g., of cycle c1) are delayed and transmitted during a phase P1 (e.g., of cycle C2). One or more data packets (e.g., of a first traffic class) transmitted during a phase P2 (e.g., of cycle c1) are delayed and transmitted during a phase P1 (e.g., of cycle C2). Thus, one or more data packets received by a network bridge during a first phase (e.g., reception phase for that bridge) are stored and delayed and forwarded during a subsequent phase (e.g., transmission phase for that bridge).

Figure 5A:
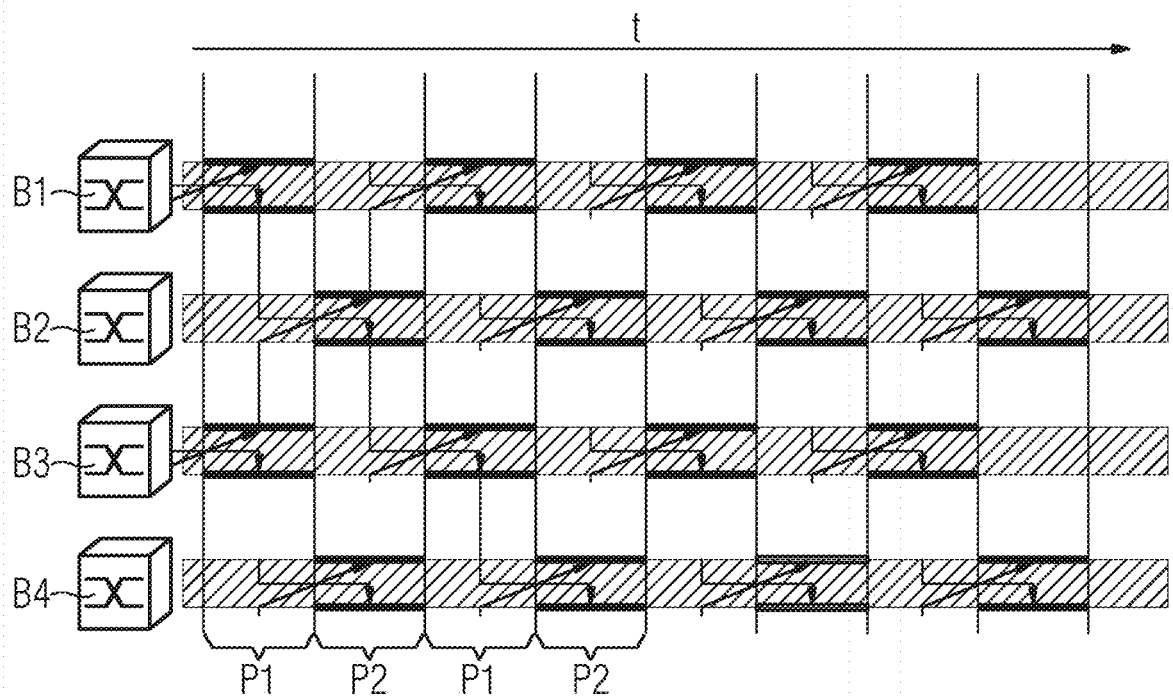
FIG. 5a shows another schematic representation of exemplary traffic scheduling for one or more data packets in an exemplary network.

FIG. 5a shows another example of scheduling traffic in an exemplary network. The exemplary network, or network segment, includes bridges B1, B2, B3 and B4. As mentioned before, more bridges that are not shown may exist. One or more data packets may be injected for the first time or forwarded by a bridge B1.

A network path of the one or more data packets in the network N may be preconfigured. For example, the spanning tree protocol (STP) may be used to determine a network path (e.g., via one or more transmission lines and one or more network nodes), such as bridges B1, B2, B3, B4 for the transmission of one or more data packets.

Thus, during a phase P1 during which the bridge B1 is configured to transmit the one or more data packets to neighbors, bridge B2 may be configured to receive one or more data packets from bridge B1 and bridge B3 during phase P1. A data packet received by bridge B2 during phase P1 from bridge B1 may be stored (e.g., temporarily stored) at bridge B2. Storing of the one or more data packets may take place in a memory of the bridge B2. In a subsequent phase P2, the one or more data packets are then transmitted from bridge B2 to bridge B3. As bridge B3 is configured to receive one or more data packets during phase P2, the one or more data packets are received by bridge B3 and stored (e.g., temporarily stored) in a memory of bridge B3. From bridge B3, the one or more data packets are then transmitted in a subsequent phase P1 to bridge B4. During this, bridge B3 is configured to transmit one or more data packets, whereas in phase P1, bridge B4 is configured to receive one or more data packets.

Simultaneous to the transmission of the one or more data packets from bridge B1 to bridge B4, one or more data packets may be forwarded or initially injected on the network by bridge B3. During phase P1, the data packet may then be transmitted by bridge B3 to bridge B2. At bridge B2, the data packet is then received during phase P1, which is a reception phase of bridge B2. The data packet may be stored (e.g., temporarily) in a memory of the bridge B2 until phase P2 of the cyclic traffic schedule begins. During phase P2, which is a transmission phase for bridge B2, the data packet received from bridge B3 is forwarded to bridge B1. As described in the above, at the same time, a data packet received from bridge B1 in the phase P1 may also be forwarded to bridge B2 during phase P2.

Hence, a traffic schedule may include phases P1 and P2 that are subsequent to each other and repeat over time. Thus, a cycle of the traffic schedule may include at least a phase P1 and a phase P2.

In order to provide that the one or more data packets are transmitted over the transmission line between two bridges, the data packets may be sent at the beginning of the respective transmission phase and may thus be received well inside the reception phase of the receiving bridge.

As can be understood from the above, one or more data packets received during a reception phase are deterred until a subsequent transmission phase. Thus, the problem of a variation of latency leading to loss of one or more data packets may be overcome, and a predictable latency for transmission of one or more data packets may be achieved. Bidirectional communication is possible by the configuration provided.

Figure 5B:
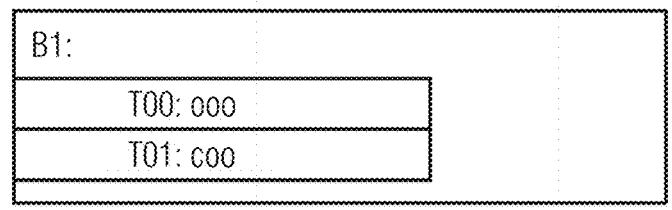
FIG. 5b shows a schematic representation of an exemplary scheduling list for gate operation of a plurality of bridges.
Figure 5B:
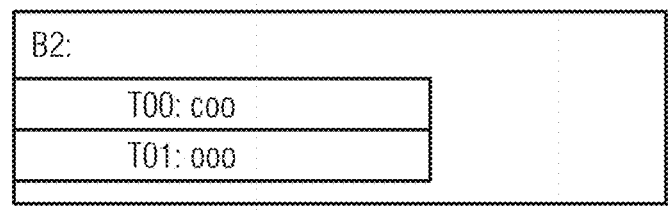

FIG. 5b shows a schematic representation of scheduling lists for gate operation of a plurality of bridges (e.g., scheduling list of two adjacent bridges B1 and B2 in the network). The scheduling lists for bridges B1 and B2 serve for implementing the traffic schedule determined. In the example considered, three traffic classes may exist on the network, which will be explained in more detail with regard to FIG. 5c. However, only a single traffic class or another number of traffic classes are present. Thus, considering a first bridge B1 and a corresponding scheduling list, during a first phase T00, all gates for the one or more queues may be open. This state is represented by "ooo" in FIG. 5b. During a second phase, the gate for a certain traffic class (e.g., the traffic class with real-time constraint) may be closed. However, the gates for transmitting one or more data packets of one or more other traffic classes may be still be open. This state is represented by "coo". Below the gate control list T1 of, for example, the first bridge, the gate control list T2 of an adjacent bridge B2 (e.g., along the transmission path) is shown in FIG. 5b. This gate control list is reversed with regard to the state of the gate for the first traffic class. In other words, during the first phase, the gate controlling transmission of one or more data packets of the first traffic class is closed. This is represented by "T00: coo". In the second phase, the gate for the first traffic class is open, which is represented by "T01:ooo". Thus, the order of transmission/reception phases (e.g., for the first traffic class) is inverted.

Another bridge (e.g., a next-but-one network bridge, along the transmission path of the one or more data packets) may be configured according to the gate control list corresponding to the one of the first bridge, as described above.

Figure 5C:
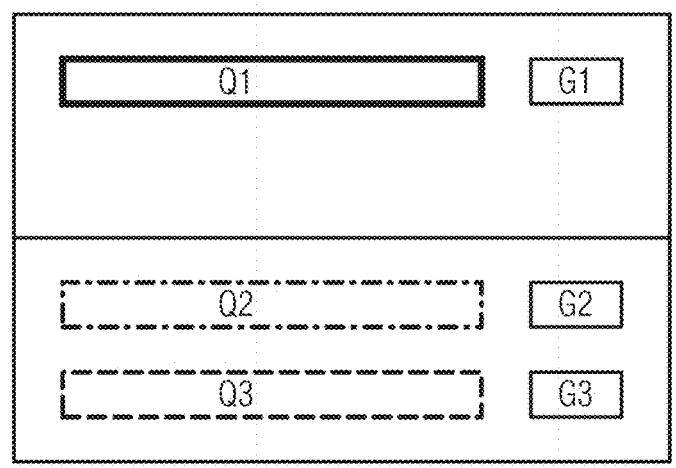
FIG. 5c shows a schematic representation of multiple exemplary queues including data packets to be transmitted on the network.

FIG. 5c shows multiple queues that may include one or more data packets to be transmitted on the network. As already described, different traffic classes may be present. Upon arrival at a bridge, the traffic classes may be sorted into different queues dependent on the respective class. Thus, queues that are dedicated to a certain traffic class may be provided. In FIG. 5c, three queues are presented: queue Q1 (e.g., dedicated to a traffic class with real time requirements) is controlled by a gate G1, whereas queues Q2, Q3 are, for example, dedicated to best effort traffic and are controlled by gates G2, G3. Gate operation may thus be controlled by the gate control list, also denoted as schedule list. Thus, a gate opens and closes and thereby allows transmission of the respective data packets of the queue controlled. Via the one or more gates, transmission may thus be omitted if a gate is closed.

Figure 6:
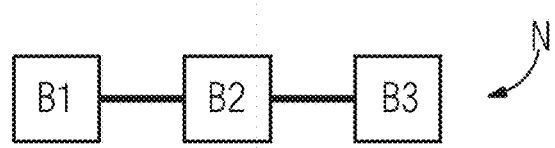
FIG. 6 shows a schematic representation of an exemplary network.

FIG. 6 shows another exemplary network in which bridges B1, B2, B3 are connected in a line topology. This connection may in this case, as in the cases described above, be a logical connection only, and the bridges may be physically connected to other network nodes as well.

FIG. 7 shows a schematic representation of multiple queues including data packets of a first traffic class and a second traffic class to be transmitted on a network N. For simplicity, only a first traffic class and a second traffic class, and respective queues Q1, Q2 and gates G1, G2 are shown in this embodiment.

Figure 8A:
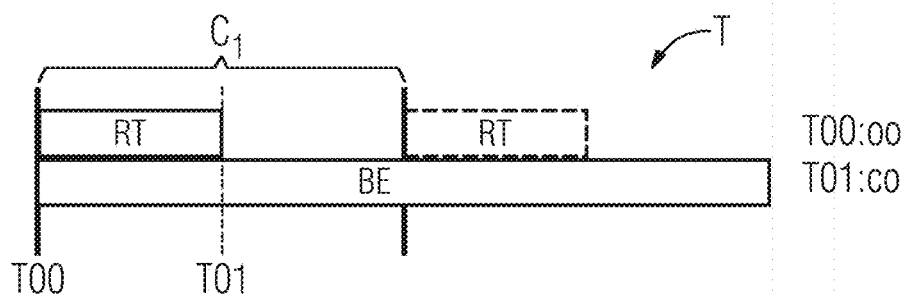
FIGS. 8a and 8b show a schematic representation of an exemplary cyclic traffic schedule for the traffic classes.
Figure 8B:
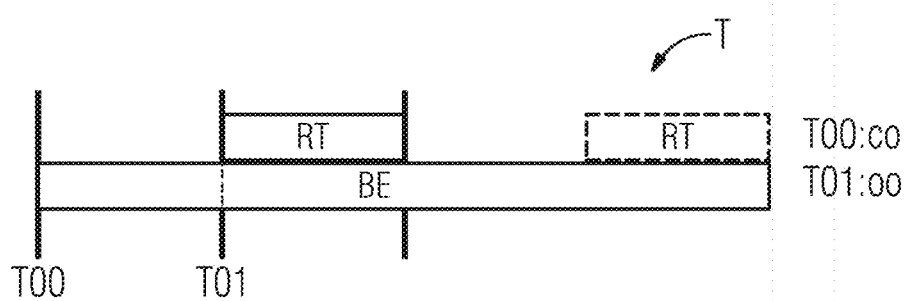

FIGS. 8a and 8b show an exemplary cyclic traffic schedule for two traffic classes RT, BE.

During a first cycle c1 of a cyclic traffic schedule, bridges B1 and B3 (e.g., of FIG. 6) may be configured as shown in FIG. 8a and as will be described in the following. During a first phase T00 of a cyclic traffic schedule, bridges B1 and B3 may be configured to transmit one or more data packets of a first traffic class (e.g., real-time traffic, denoted by RT in FIG. 8a). This phase is thus a transmission phase T00 for the first traffic class. During the same phase T00, however, bridges B1, B3 may be configured to transmit and/or receive one or more data packets of another traffic class as well. During the phase T01, transmission of one or more data packets of the first traffic class is omitted. This phase T01 of the cyclic traffic schedule may then be used for reception of one or more data packets of the first traffic class. During the phase T01 transmission and/or reception of a second traffic class, in this case, best-effort traffic BE may be continued. At the end of the first cycle, including phases T00 and T01, the traffic schedule repeats.

The corresponding gate control list is shown on the right in FIG. 8a.

In order to resolve interference and/or collision with the second traffic class, with one or more data packets of different traffic classes and/or with itself, the first traffic class may be given a higher priority and/or a carrier sense multiple access (CSMA) method may be employed.

In FIG. 8b, an exemplary configuration of a bridge B2 (e.g., of the network N, as shown in FIG. 6) is shown. During the first phase T00, transmission of one or more data packets of the first traffic class is omitted. This phase T00 may thus be used as a reception phase for one or more data packets of the first traffic class. During phase T00, another traffic class such as best-effort traffic may be transmitted and/or received. During phase T01, transmission of the first traffic class may occur. During this phase T01, transmission and/or reception of the other traffic class (e.g., best-effort traffic BE) may also occur. After a cycle, including phases T00 and T01 (not necessarily in that order), the traffic schedule may repeat.

An exemplary corresponding gate control list is shown on the right in FIG. 8b.

In general, network bridges in a line topology may be numbered consecutively. The configuration of bridges, as shown and explained with regard to FIGS. 6, 7, 8a, 8b, may be applied to even and odd numbered network bridges, respectively. Thus, the configuration of transmission and/or reception of the first traffic class is phase-shifted between adjacent network bridges. Thus, a first bridge may be configured according to FIG. 8a, and a second bridge, adjacent to the first bridge with respect to the transmission path of the one or more data packets, may be configured according to FIG. 8b. A third bridge, adjacent to the second bridge with respect to the transmission path of the one or more data packets, is then again configured according to FIG. 8a.

Figure 9A:
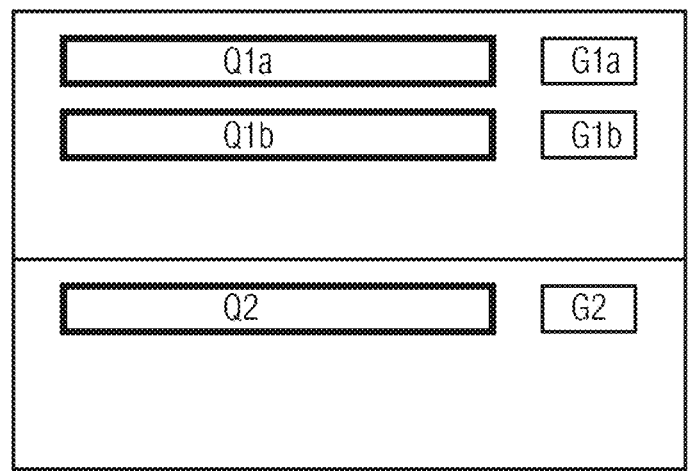
FIG. 9a shows a schematic representation of multiple exemplary queues including data packets of a first traffic class, a second traffic class, and a third traffic class to be transmitted on the network.

FIG. 9a shows a schematic representation of multiple queues including data packets of a first, second, and third traffic class to be transmitted on a network. In this case, the first traffic class and the second traffic class, denoted as RT1, RT2, and BE in FIG. 9b, may be subject to a real-time constraint. The third traffic class may again be a traffic class with best-effort requirements. One or more data packets of the first traffic class and/or second traffic class may be stored (e.g., temporarily) in a respective queue Q1a, Q1b, and transmission of one or more data packets from the respective queue Q1a, Q1b may be controlled by a separate gate G1a, G1b. Transmission of one or more data packets from the queue Q2 may be controlled by a gate G2.

Figure 9B:
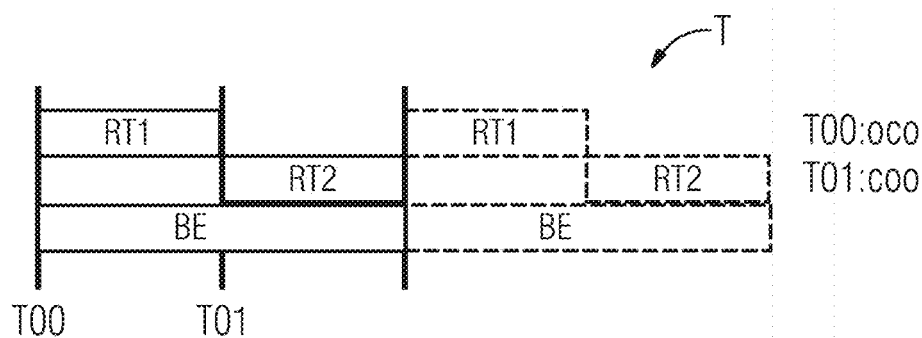
FIG. 9b shows a schematic representation of an exemplary cyclic traffic schedule for the traffic classes.

FIG. 9b shows a cyclic traffic schedule for the first traffic class, the second traffic class, and the third traffic class, as described. During a first phase T00 of a cyclic traffic schedule, one or more data packets of the first traffic class RT1 may be transmitted, whereas during a second phase T01, one or more data packets of the second traffic RT2 class may be transmitted. During both the first phase and the second phase T00, T01, one or more data packets of the third traffic class BE may be transmitted and/or received. Resolution of potential collision between one or more data packets of the first traffic class or the second traffic class RT1, RT2, with one or more data packets of the third traffic class BE, may be resolved, as explained in the above.

Figure 10A:
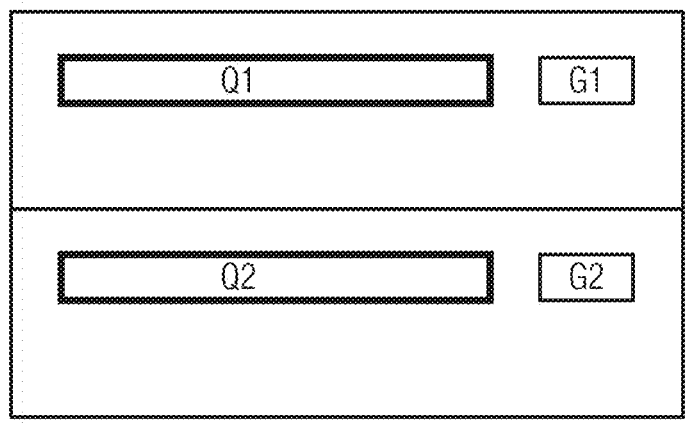
FIG. 10a shows a schematic representation of multiple exemplary queues including data packets of a first traffic class and a second traffic class to be transmitted on the network.

FIG. 10a shows another embodiment of multiple queues including data packets of a first traffic class and a second traffic class to be transmitted on a network N. FIG. 10a corresponds to FIG. 7, and reference is made to the description of FIG. 7 for details shown in FIG. 10a. However, only one traffic class may be present, and thus, only one queue and/or one gate are present (e.g., in one or more of the network bridges). More than the two traffic classes and thus a respective number of queues and/or gates may be present (e.g., in one or more of the network bridges).

Figure 10B:
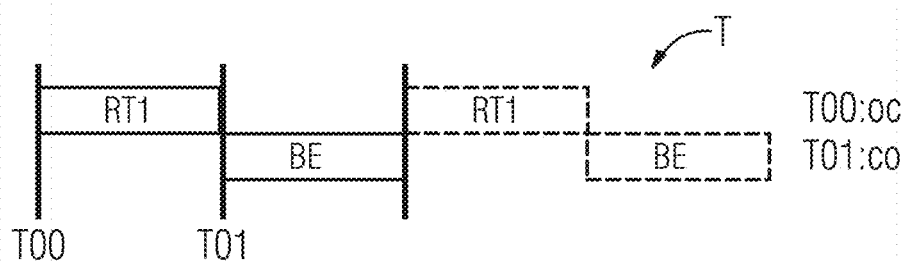
FIG. 10b shows a schematic representation of an exemplary cyclic traffic schedule for the traffic classes.

FIG. 10b shows a cyclic traffic schedule for the two traffic classes RT1, BE stored in the queues Q and Q2, respectively, of FIG. 10a. A first traffic class RT1 (e.g., with real-time requirements) may be transmitted during a first phase T00 of the cyclic traffic schedule. During the phase, no other traffic (e.g., in the form of one or more data packets of a second traffic class BE) may be transmitted. Thus, transmission of the second traffic class is omitted during phase T00. During phase T01, one or more data packets of the second traffic class BE, such as, for example, real-time traffic or best-effort traffic, may be transmitted. Transmission of one or more data packets of the first traffic class is omitted during phase T01. The subsequent cycle of the traffic schedule starts again with phase T00, during which one or more data packets of the first traffic class RT1 are transmitted and transmission of one or more data packets of the second traffic class BE are omitted.

The corresponding gate control list is shown on the right of FIG. 10b. During the first phase T00, the gate G1 is closed and gate G2 is open. This state is represented as "T00:0c". During phase T01, gate G1 is closed, whereas gate G2 is open. This state is represented as "T01: co" in FIG. 10b.

The configuration shown in FIG. 10b may be employed for accordingly configuring one or more network bridges (e.g., bridges B1 and B3 of FIG. 6). Bridge B2 of FIG. 6 may then be configured with a traffic schedule that corresponds to the traffic schedule of FIG. 10b, but which is shifted half a cycle (e.g., one phase) of the traffic schedule shown in FIG. 10b. Thus, the traffic schedule of bridge B2 (and a cycle thereof) may begin with phase T02, which is followed by phase T01. A bridge B2, as shown in FIG. 6, may be configured with the traffic schedule of FIG. 10b, and bridges B1 and B3 (e.g., of FIG. 6) may then be configured with the shifted traffic schedule.

Figure 11A:
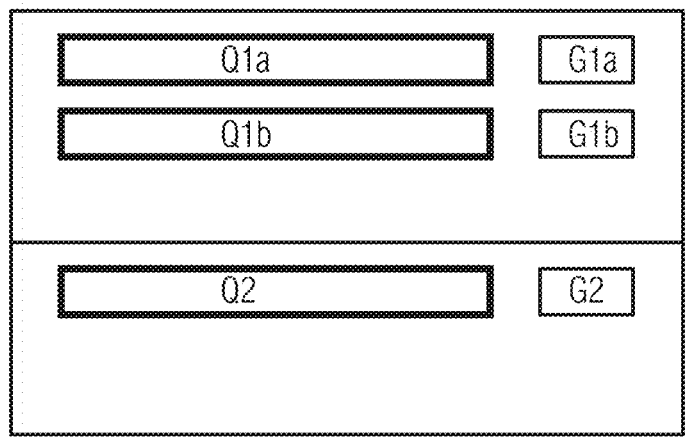
FIG. 11a shows a schematic representation of multiple exemplary queues including data packets of a first traffic class, a second traffic class, and a third traffic class to be transmitted on the network.

FIG. 11a shows multiple queues including data packets of a first traffic class, a second traffic class, and a third traffic class to be transmitted on the network. FIG. 11a corresponds to FIG. 9a, and hereby, reference is made to the description of FIG. 9a.

FIG. 11b shows two cyclic traffic schedules T1, T2 for the three traffic classes of FIG. 11a. Two traffic classes (e.g., with real-time requirements), each with a respective phase T01, T02 for transmission of one or more data packets (e.g., transmission phase), may be configured. Thus, for the first traffic schedule, during a first phase RT1, the first traffic class may be transmitted, and the transmission of one or more data packets of the second traffic class and the third traffic class are omitted. During the second phase T02, one or more data packets of the second traffic class are transmitted, and transmission of one or more data packets of the first traffic class and the third traffic class are omitted during phase T02. During phase T03, one or more data packets of the third traffic class may only be transmitted, and transmission of one or more data packets of the first traffic class and the second traffic class are omitted during phase T03.

Turning to the second traffic schedule T2 in FIG. 11b, the transmission phase for the second traffic class RT2 is arranged in the first phase T01 of the traffic schedule T01. During the first phase T01, transmission of one or more data packets of the first traffic class and the third traffic class is omitted. Following upon the first phase T01, a second phase T02, in which transmission of one or more data packets of the first traffic class occurs, is arranged. During the second phase T02, transmission of one or more data packets of the second traffic class and the third traffic class is omitted. During the third phase T03, as above, one or more data packets of the third traffic class is transmitted, whereas the transmission of the first traffic class and the second traffic class is omitted.

As is depicted in FIG. 11b, the traffic schedules T1, T2 repeat after phase T03. This traffic schedule may be applied in a manner analogue to FIG. 10b to the network bridges B1, B2, B3. Thus, for example, bridges B1 and B3 may be configured with the traffic scheduled T1, whereas bridge B2 is configured with the traffic schedule T2. In one embodiment, bridges B1 and B3 may be configured with traffic schedule T2, and bridge B2 may be configured with traffic schedule T1.

FIG. 11c shows the states of the respective gates during the cyclic traffic schedule of FIG. 11b. During the first phase T01 of schedule T1, gate G1a is open, and gates G1b and G2 are closed. During phase T02, gates G1a and G2 are closed, and gate G1b is open. During the third phase T03, gates G1a and G1b are closed, and gate G2 is open.

During the first phase T01 of traffic schedule T2, gates G1a and G2 are closed, and gate G1b is open. During the second phase, gate G1a is open, and gate G1b and G2 are closed. During the third phase of traffic schedule T2, gates G1a and G1b are closed, and gate G2 is open.

As in the cases above, this gate control list may be loaded and applied to respective bridges in the network. Thus, the network bridges may be configured by the gate control lists. Hence, transmission phases for one or more traffic classes may be set, for example, by one or more gate control lists.

FIG. 12 shows a schematic representation of data packet transmission in an exemplary network. Transmission of data packets P1 and P2 of a first traffic class through a network of a plurality of network bridges is described below. Data packet P1 may originate at bridge B1, which may be a network edge node or a network terminal node. Alternatively, data packet P1 may be forwarded by bridge B1. In both cases, data packet P1 will be received at a certain point in time by bridge B1. In the embodiment shown in FIG. 12, data packet P1 is received in a reception phase of the traffic schedule of bridge B1. Thus, the data packet P1 is processed by bridge B1 and injected on the medium (e.g., at the beginning) of a subsequent transmission phase of the traffic schedule of bridge B1. As the transmission over the medium from bridge B1 to bridge B2 takes some time, data packet P1 is received at a later point in time at the bridge B2. During the phase of the traffic schedule, during which bridge B1 is configured to transmit one or more data packets, bridge B2 is configured to receive one or more data packets (e.g., bridge B2 may be configured to omit transmission of one or more data packet during this phase). Data packet P1 received by bridge B2 is received and processed by bridge B2 and forwarded, for example, as shown, at the beginning of the subsequent phase of the traffic schedule, which is a transmission phase for bridge B2.

Another data packet P2 is travelling the opposite direction through the network N. Data packet P2, received by bridge B4 is transmitted from bridge B4 to bridge B3 (e.g., at the beginning of a transmission phase of the traffic schedule of bridge B4). Subsequently, the data packet P2 is received by bridge B3. Data packet P2 is then processed by bridge B3 and forwarded to bridge B2. As shown, the transmission of data packet P2 from bridge B3 to bridge B2 may be delayed and may not necessarily take place at the beginning of the transmission phase of the traffic schedule of bridge B3 (e.g., which phase is at the same time a reception phase of bridge B2). The delay occurring at bridge B2, however, is compensated for, as bridge B2 is processing and forwarding the data packet P2 at the beginning of a subsequent transmission phase of a corresponding traffic schedule. Thus, one or more data packets are received, processed, and forwarded by bridge B2 with a defined latency. Bridge B2 is only considered as an exemplary network node or network bridge, and the mechanisms described throughout the present specification may apply to any one of the network nodes or bridges.

During a reception phase of bridge B2, both data packets P1 and P2 are received by bridge B2. As data packet P1 is destined for bridge B3 and data packet P2 is destined for bridge B1, data packets P1 and P2 may be transmitted (e.g., at the beginning of a subsequent transmission phase of bridge B2). Thus, the transmission phase is a transmission phase for bridge B2 into the direction of bridge B1 and a transmission phase for bridge B2 into the direction of bridge B3. During this transmission phase, bridges B1 and B3 are configured to omit transmission of one or more data packets of the same traffic class. Thus, bridge B3 is, during that phase, configured to omit transmission of one or more data packets into the direction of bridge B2 and bridge B4. This enables bridge B3 to receive, during that phase, transmission from bridges B2 and B4 and delay the transmission until the beginning of the next transmission phase to eliminate jitter in the transmission of the received one or more packets.

In general, the configuration of the traffic schedules for one or more data packets of a certain traffic class of bridges B1 and B3 correspond to each other. The configuration of the traffic schedules for the same traffic class of bridges B2 and B4 correspond to each other. However, the configuration of bridges B1 and B2, bridges B2 and B3, and bridges B3 and B4 differ from one another. The difference may lie in that the respective traffic schedules are phase-shifted with respect to each other or that the respected phases of the traffic schedules for reception and transmission of a certain traffic class are exchanged or opposite to each other.

Figure 13:
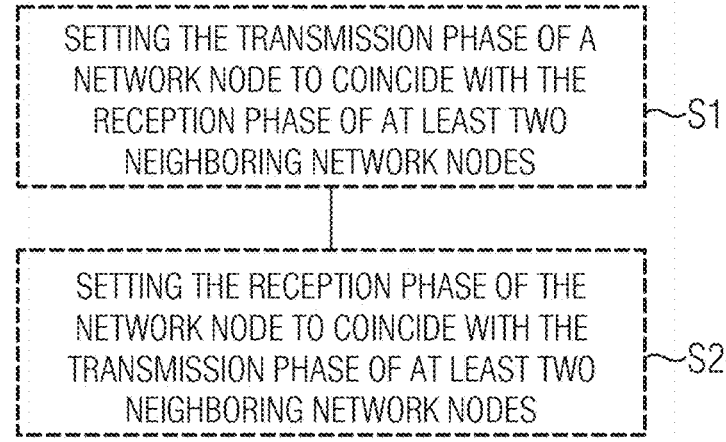
FIG. 13 shows a first embodiment of an exemplary method.

Now turning to FIG. 13, an embodiment of a method is provided. In act S1, the transmission phase of a network node may be set to coincide with the reception phase of at least two neighboring nodes. As described in the above, setting may relate to configuring the respective network node accordingly (e.g., via a gate control list). Reception may be the absence of transmission (e.g., the respective node(s) or neighboring node(s) may omit transmission of one or more data packets of the traffic class considered). Reception may include the physical reception of respective signals and/or the decoding of the physical signals representing one or more data packets.

As shown by the examples provided in the above, a network node may be a network bridge. Neighboring may refer to one or more adjacent network node(s) within a logical and/or physical topology (e.g., a line topology). The neighboring network node(s), or at least one of the neighboring network nodes, may also be network bridges. Coincide may be at least partly overlapping in the time domain. Thus, the reception phase (e.g., of the neighboring node(s)) may nonetheless be longer in time than the transmission phase (e.g., of the one or more (neighboring) nodes transmitting the one or more data packets of a first traffic class). A traffic class may be grouping data packets into different groups (e.g., dependent on content, the information conveyed by the content, and the relevance of the content for an application within which the data is to be used). For example, a traffic class may be provided by one or more identifiers or labels in a data packet or frame header. A traffic class may be further identified by one or more data packets of the class that are treated by one or more individual bridges.

In act S2, the reception phase of the network node may be set to coincide with the transmission phase of at least two neighboring nodes. This provides for mutually oppositely configured phases of the traffic schedules of neighboring network nodes. Thus, when a network bridge is in a transmission phase or configured accordingly, neighbors are in a reception phase and vice versa, always with respect to one or more traffic classes.

Figure 14:
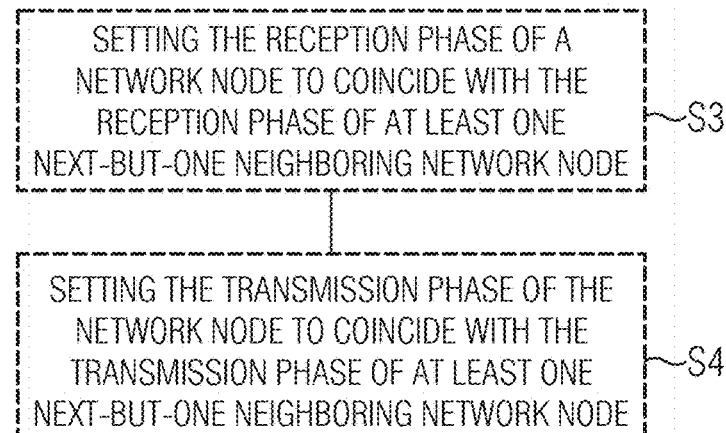
FIG. 14 shows a second embodiment of an exemplary method.

Now turning to FIG. 14, in act S3, the reception phase of a network node is set to coincide with the reception phase of at least one next but one neighboring network node. In act S4, the transmission phase of a network node may be set to coincide with the transmission phase of at least one next but one neighboring network node (e.g., in the transmission path of the one or more data packets). In one embodiment, the reception and/or transmission phase is set to coincide with the two next-but-one neighboring network nodes (e.g., the respective network nodes in the at least two possible directions of data packet transmission and/or reception).

One or more of the acts S1, S2, S3, S4 may be performed without performing the other. Also, the order of acts S1, S2, S3, S4 may be exchanged.

Figure 15:
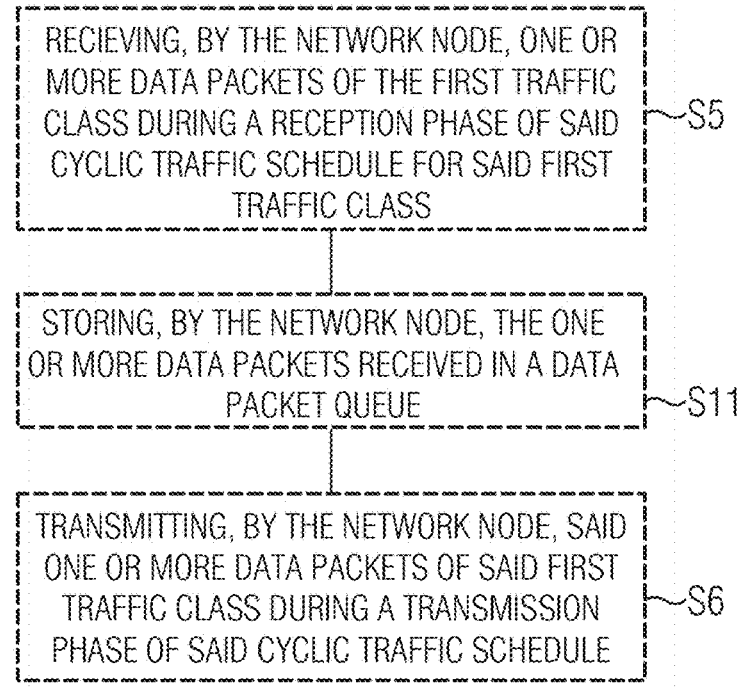
FIG. 15 shows a third embodiment of an exemplary method.

Now turning to FIG. 15, in act S5, one or more data packets of the first traffic type are received by the network node during a reception phase of a cyclic traffic schedule for the first traffic class.

In act S11, the one or more data packets received may be stored in a data packet queue. The data packet queue may be exclusive for the data packets of a certain traffic type (e.g., the first traffic type). For example, only one queue for a certain traffic type may exist.

In a subsequent act S6, the one or more data packets of the first traffic class are transmitted (e.g., forwarded by the network node) during a transmission phase of the traffic schedule. For the purposes of the current disclosure, a traffic schedule repeats itself and is thus cyclic.

Figure 16:
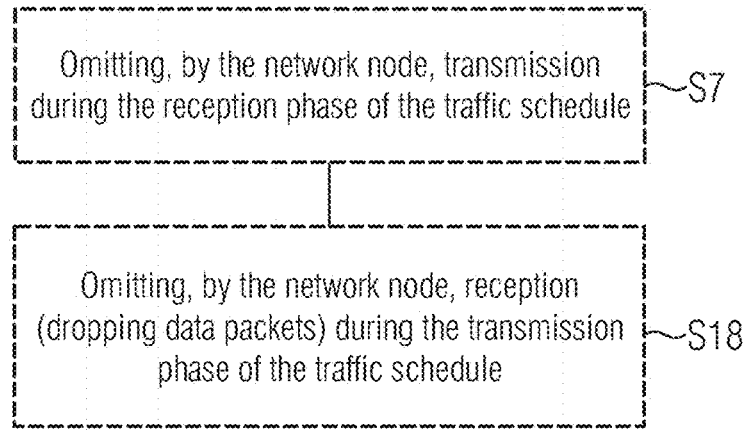
FIG. 16 shows a fourth embodiment of an exemplary method.

According to FIG. 16, a network node may in act S7 omit transmission during the reception phase. It may be provided according to certain protocols that simultaneous transmission and reception takes place.

In act S8, a network node may omit reception during a transmission phase of a corresponding traffic schedule. Simultaneous transmission and reception may, however, be allowed according to certain protocols. Transmission and/or reception or the omission thereof refer to a certain traffic class.

Figure 17:
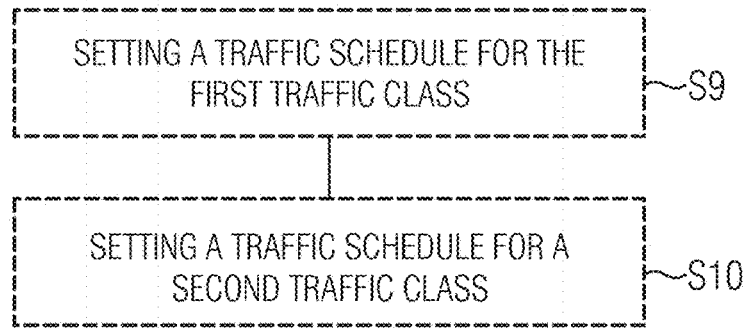
FIG. 17 shows a fifth embodiment of an exemplary method.

As shown in the embodiment of FIG. 17, in act S9, a traffic schedule for a first traffic class may be set. In a subsequent act (which may be performed at the same time), a traffic schedule for a second traffic class may be set. IT may be that one or more network nodes, such as bridges, may be configured with one or more traffic class.

Figure 18:
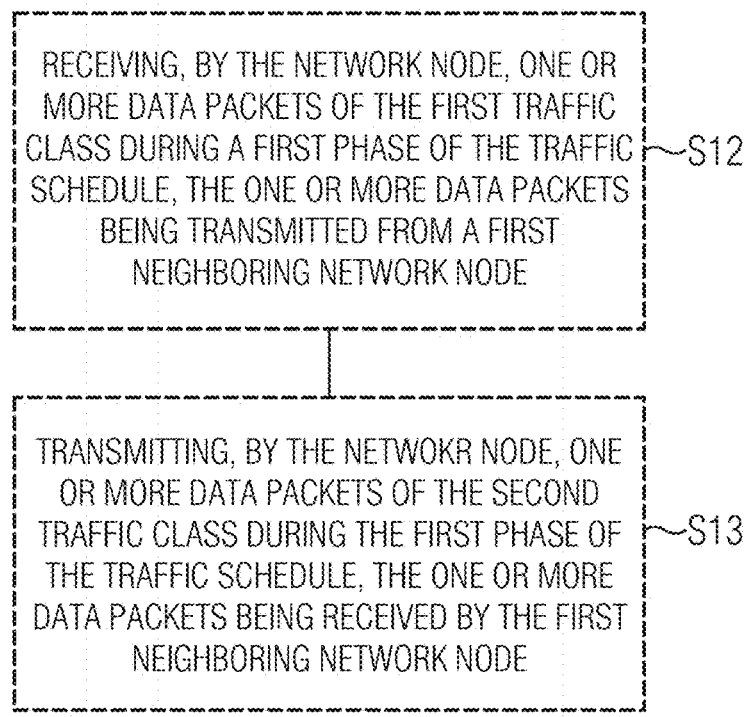
FIG. 18 shows a seventh embodiment of an exemplary method.

In act 12, as shown in FIG. 18, one or more data packets of the first traffic class may be received during a first phase of the traffic schedule. The one or more data packets are transmitted from a neighboring network node (e.g., a first neighboring network node).

In act S13 or simultaneously, one or more data packets of the second traffic class may be transmitted during the first phase by the network node. The one or more data packets of the second traffic class are received by the neighboring node (e.g., the first neighboring node).

Figure 19:
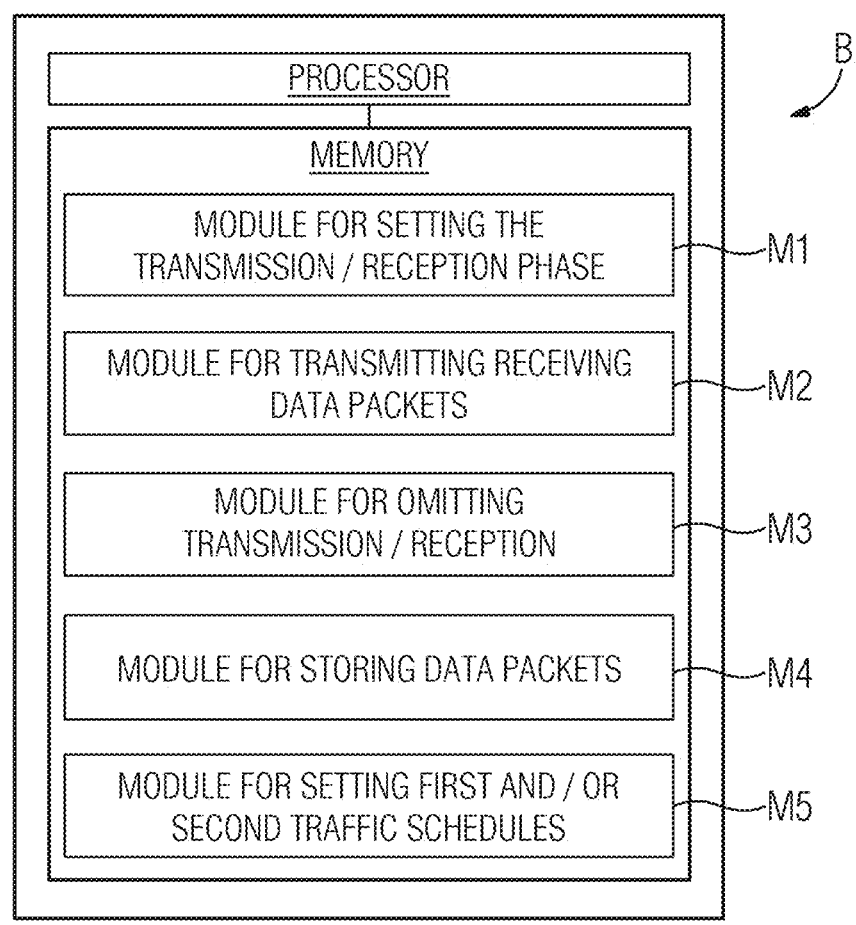
FIG. 19 shows an embodiment of an exemplary network bridge.

FIG. 19 shows an exemplary structure of a network bridge B. A network bridge may include one or more processors that are operatively connected to a memory. The memory may include one or more modules M1, M2, M3, M4, M5. The memory may also include further modules, not shown, for performing any one or a combination of the method acts, as presented in the above. For example, the bridge B may include a module M1 for setting the transmission or reception phase of a traffic schedule. Further, the bridge B may include a module M2 for transmitting and/or receiving one or more data packets. The data packets may be of the first, second, third, or any other traffic class. Further, the bridge B may include a module for omitting transmission and/or reception of any one of the mentioned traffic classes. The bridge may further include a module for storing (e.g., temporarily storing) one or more data packets of the one or more traffic cases in one or more respective data packet queues. The bridge B may include a module for setting a first traffic schedule (e.g., for the first traffic class) and/or for setting a second traffic schedule (e.g., for the second traffic class).

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of scheduling traffic in a network node of a network, wherein nodes of the network are connected to each other by transmission lines, and wherein a cyclic traffic schedule for a first traffic class includes a reception phase and a transmission phase, the method comprising:
setting the transmission phase of the network node to coincide with the reception phase of at least two neighboring network nodes; and
setting the transmission phase of the network node to coincide with the transmission phase of at least one next-but-one neighboring network node,
wherein the network node, the at least two neighboring network nodes, and the at least one next-but-one neighboring network node are configured based on a traffic-class and a phase-shifted traffic schedule,
wherein the at least two neighboring network nodes are configured to omit transmission of one or more data packets of the first traffic class, and
wherein based on the phase-shifted traffic schedule, the reception phase and the transmission phase of the first traffic class are exchanged or opposite to each other.

2. The method of claim 1, further comprising:
setting the reception phase of the network node to coincide with the transmission phase of at least two neighboring network nodes.

3. The method of claim 1, further comprising:
setting the reception phase of the network node to coincide with the reception phase of at least one next-but-one neighboring network node.

4. The method of claim 1, further comprising:
setting phases of the cyclic traffic schedule for the first traffic class to alternate between two adjacent network nodes.

5. The method of claim 1, further comprising:
transmitting, by the network node, one or more data packets of the first traffic class during a transmission phase of the cyclic traffic schedule;
receiving, by the network node, one or more data packets of the first traffic class during a reception phase of the cyclic traffic schedule for the first traffic class; or
a combination thereof.

6. The method of claim 1, further comprising:
omitting, by the network node, transmission during the reception phase of the traffic schedule.

7. The method of claim 1, further comprising:
omitting, by the network node, reception during the transmission phase of the traffic schedule.

8. The method of claim 1, further comprising providing at least one additional traffic schedule for one or more data packets of another traffic class,
wherein the at least one additional traffic schedule is configurable independent of the traffic schedule for the first traffic class.

9. The method of claim 1, wherein the transmission phase directly follows upon the reception phase, or the reception phase directly follows upon the transmission phase,
wherein the transmission phase and the reception phase alternate across a plurality of consecutive traffic schedules,
wherein there is a gap between the transmission phase and the reception phase and an end of a cyclic traffic schedule, and
wherein the gap is reserved for the other traffic type.

10. The method of claim 1, wherein a network comprises a plurality of network nodes that are interconnected in a loop-free topology, the plurality of network nodes comprising the network node.

11. The method of claim 10, wherein the plurality of network nodes are interconnected in a loop-free topology with a single active path for data packet transmission, reception, or transmission and reception between two adjacent network nodes, between the plurality of network nodes of the network, or between two adjacent network nodes and between the plurality of network nodes of the network.

12. The method of claim 1, further comprising:
storing, by the network node, one or more data packets received in a data packet queue,
wherein only a single data packet queue for the one or more data packets of the first traffic class exists.

13. The method of claim 1, further comprising:
storing, by the network node, one or more data packets of a first traffic type in a first data packet queue; and
storing, by the network node, one or more data packets of a second traffic type in a second data packet queue.

14. The method of claim 1, further comprising:
receiving, by the network node, one or more data packets of the first traffic class during the first phase of the traffic schedule, the one or more data packets being transmitted from a first neighboring network node; and
transmitting, by the network node, one or more data packets of the second traffic class during the first phase of the traffic schedule, the one or more data packets being received by a first neighboring network node,
wherein the transmission by the network node coincides with transmission of one or more data packets of the second traffic class by a next-but-one neighboring network node.

15. A network node of a network, the network node comprising:
a processor configured to schedule traffic in the network node, wherein nodes of the network are connected to each other by transmission lines, and wherein a cyclic traffic schedule for a first traffic class includes a reception phase and a transmission phase, the processor being configured to schedule the traffic comprising the processor being configured to:
set the transmission phase of the network node to coincide with the reception phase of at least two neighboring network nodes; and
set the transmission phase of the network node to coincide with the transmission phase of at least one next-but-one neighboring network node,
wherein the network node, the at least two neighboring network nodes, and the at least one next-but-one neighboring network node are configured based on a traffic class and a phase-shifted traffic schedule,
wherein the at least two neighboring network nodes are configured to omit transmission of one or more data packets of the first traffic class, and
wherein based on the phase-shifted traffic schedule, the reception phase and the transmission phase of the first traffic class are exchanged or opposite to each other.

16. The network node of claim 15, wherein the network node is a network bridge.

17. A network comprising:
a plurality of network nodes, a network node of the plurality of network nodes being configured to schedule traffic in the network node, wherein the plurality of network nodes are connected to each other by transmission lines, and wherein a cyclic traffic schedule for a first traffic class includes a reception phase and a transmission phase, the network node being configured to schedule the traffic comprising the network node being configured to:
- set the transmission phase of the network node to coincide with the reception phase of at least two neighboring network nodes; and
- setting the transmission phase of the network node to coincide with the transmission phase of at least one next-but-one neighboring network node, wherein the network node, the at least two neighboring network nodes, and the at least one next-but-one neighboring network node are configured based on a traffic class and a phase-shifted traffic schedule, wherein the at least two neighboring network nodes are configured to omit transmission of one or more data packets of the first traffic class, and wherein based on the phase-shifted traffic schedule, the reception phase and the transmission phase of the first traffic class are exchanged or opposite to each other.

* * * * *